US008325081B2

(12) United States Patent
Rivers et al.

(10) Patent No.: US 8,325,081 B2
(45) Date of Patent: Dec. 4, 2012

(54) IDENTIFICATION FRIEND OR FOE (IFF) SYSTEM

(75) Inventors: Cornelia F. Rivers, Baltimore, MD (US); Thomas H. Powell, Cockeysville, MD (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 12/792,991

(22) Filed: Jun. 3, 2010

(65) Prior Publication Data

US 2010/0309039 A1 Dec. 9, 2010

Related U.S. Application Data

(60) Provisional application No. 61/183,797, filed on Jun. 3, 2009.

(51) Int. Cl.
 *G01S 13/78* (2006.01)
(52) U.S. Cl. .......................................... 342/45; 342/148
(58) Field of Classification Search .................. 342/42, 342/44, 45, 148
See application file for complete search history.

(56) References Cited

U.S. PATENT DOCUMENTS

| 3,715,750 | A |  | 2/1973 | Bishop |  |
| 4,656,477 | A |  | 4/1987 | Ronconi et al. |  |
| 5,107,268 | A | * | 4/1992 | Sturm et al. | 342/36 |
| 5,877,721 | A | * | 3/1999 | Tsang et al. | 342/36 |
| 6,473,027 | B1 | * | 10/2002 | Alon | 342/37 |
| 6,958,677 | B1 | * | 10/2005 | Carter | 340/10.1 |
| 7,675,456 | B2 | * | 3/2010 | Karam et al. | 342/45 |
| 2002/0180631 | A1 | * | 12/2002 | Alon | 342/37 |
| 2007/0096876 | A1 | * | 5/2007 | Bridgelall et al. | 340/10.1 |
| 2008/0238623 | A1 | * | 10/2008 | Rofougaran et al. | 340/10.1 |
| 2008/0238626 | A1 | * | 10/2008 | Rofougaran et al. | 340/10.1 |
| 2010/0309039 | A1 | * | 12/2010 | Rivers et al. | 342/42 |

OTHER PUBLICATIONS

Van Yem Vu; Delai, A.B.; , "Digital Solution for inter-vehicle localisation system by means of Direction-Of-Arrival," Intelligent Signal Processing and Communications, 2006. ISPACS '06. International Symposium on , vol., No., pp. 875-878, Dec. 12-15, 2006.*
PCT Search Report dated Sep. 7, 2010 for PCT/US2010/037173.
PCT Written Opinion dated Sep. 7, 2010 for PCT/US2010/037173.
International Preliminary Report on Patentability of the ISA for PCT/US2010/037173 dated Dec. 15, 2011.

* cited by examiner

*Primary Examiner* — John B Sotomayor
(74) *Attorney, Agent, or Firm* — Daly, Crowley, Mofford & Durkee, LLP (57) ABSTRACT

A method and apparatus for reducing transponder responses to reflected signals utilizes data in an interrogator message to confirm that if two interrogations are received within a predetermined period of time and if the two interrogator signals correspond to a side lobe followed by a reflected main beam signal, the presence of multipath reflection can be correctly identified and the reply to the main beam interrogation can be suppressed.

8 Claims, 6 Drawing Sheets

IDENTIFICATION FRIEND OR FOE (IFF) SYSTEM

CROSS REFERENCE TO RELATED APPLICATIONS

This application claims priority under 35 U.S.C. §119(e) from U.S. Provisional Patent Application No. 61/183,797 filed Jun. 3, 2009 which application is hereby incorporated herein by reference in its entirety for all purposes.

FIELD OF THE INVENTION

The system and techniques described herein relate generally to air traffic control systems and more particularly to a method and apparatus for reducing aircraft transponder responses to reflected interrogation signals.

BACKGROUND OF THE INVENTION

As is known in the art, air traffic control is a service to promote the safe, orderly, and expeditious flow of air traffic. Safety is principally a matter of preventing collisions with other aircraft, obstructions, and the ground; assisting aircraft in avoiding hazardous weather; assuring that aircraft do not operate in airspace where operations are prohibited; and assisting aircraft in distress. Orderly and expeditious flow assures the efficiency of aircraft operations along the routes selected by the operator. It is provided through the equitable allocation of resources to individual flights, generally on a first-come-first-served basis As is also known, the need to easily and reliably identify aircraft led to the development of the so-called "identification friend or foe" (IFF) system which is known in non-military use as secondary surveillance radar (SSR) or (in the United States) as the air traffic control radar beacon system (ATCRBS). Both the civilian SSR and the military IFF systems are compatible such that military aircraft can safely operate in civil airspace. IFF and SSR systems generally contain a ground radar component often referred to as an interrogator which includes an antenna which is typically mechanically scanned (e.g. by rotating the antenna), but which can also be electronically scanned. The interrogator is often co-located with a primary radar. IFF/SSR systems also include a piece of equipment aboard the aircraft known as a transponder. The transponder is a radio receiver and transmitter which receives on one frequency (i.e. the interrogator frequency) and transmits on another. A target aircraft's transponder replies to signals from the interrogator by transmitting a coded reply signal containing the requested information.

IFF/SSR systems continuously transmit interrogation pulses (selectively rather than continuously in Mode-4, Mode-5, and Mode-S) as its antenna rotates, or is electronically scanned in space. A transponder on an aircraft that is within line-of-sight range 'listens' for the IFF/SSR interrogation signal and sends back a reply that provides aircraft information. IFF/SSR systems can transmit one of a plurality of different modes and the reply sent by the transponder depends upon the mode that was interrogated. Based upon the transponder reply, the aircraft is displayed as a tagged icon on a display of an air traffic controller, for example, at the calculated bearing and range. An aircraft without an operating transponder still may be observed by primary radar, but would be displayed to the air traffic controller without the benefit of IFF/SSR derived data.

As mentioned above, there are a plurality of different transponder modes. One particular mode is referred to as Mode 5 (M5). Mode 5 provides crypto secure capability similar to Mode S including transmission of automatic dependent surveillance-broadcast (ADS-B) and global positioning system (GPS) position (military only).

In areas of high multi-path conditions, IFF/SSR transponders sometimes reply to reflections of M5 interrogations (sometimes referred to simply as "M5 replies"). This can occur even when a primary waveform (i.e. the first waveform to be received by a transponder) contains a side lobe suppression pulse of proper amplitude to initiate suppression, if the reflected interrogation (i.e. the second received by the transponder) does not contain a sidelobe pulse of proper amplitude. This is because interrogation repeat protection occurs after decryption and an interrogation signal that is in side lobe suppression is never decrypted. This phenomena leads to many more M5 replies than is desired which in turn leads to more decryption loading on the interrogator and reduced reliability of target IDs in scenarios involving multiple aircraft.

One technique for solving the problem of transponders replying to multipath signals is to expand (i.e. increase) the acceptable position of a side lobe pulse to initiate suppression by two microseconds. This approach solves close-in multipath problems, but has many weaknesses. For example, this approach masks out good targets that happen to occur within the expanded window of a separate interrogator's side lobe pulse.

SUMMARY OF THE INVENTION

In accordance with the concepts, techniques and systems described herein, a transponder includes a linear receiver configured to receive one or more interrogator signals, an analog-to-digital converter (ADC) configured to receive an analog signal from the linear receiver at an input thereof and to provide a digital signal at an output thereof and a digital processor configured to receive digital signals provided thereto from the ADC and to utilize data contained in an interrogator signal to confirm that if two interrogator signals are received within a predetermined period of time and if the first interrogator signal corresponds to a side lobe interrogator signal and the second interrogator signal corresponds to a reflected main beam signal (i.e. a reflected version of the first received interrogator signal), the transponder does not provide a reply signal.

With this particular arrangement, a transponder which provides a reduced number of replies to reflections of M5 interrogation signals is provided. In one embodiment, if an interrogator preamble having a side lobe pulse above a predetermined threshold is detected by a transponder, a timer is started and the interrogation symbols provided as part of the interrogator signal are stored. If any other interrogation signals that are not in side lobe suppression are received prior to expiration of the timer, its interrogation symbols are compared to the interrogation symbols of the first received interrogation signal. If the interrogation symbols of the two waveforms match (i.e. if the two interrogation signals match), the transponder reply process is ended. If interrogation symbols from the two interrogation signals do not match, reply processing is continued in the transponder.

With this technique, a transponder which is able to recognize and not respond to reflected interrogation signals is provided. This technique utilizes some or all of the data available from the waveform to verify that the second received waveform is a reflection of the first waveform. This technique is also flexible and can be tailored for operation with reflected signals having different amounts of delays.

In accordance with further concepts described herein, a method for determining whether a transponder should reply to an interrogator signal includes (a) determining if two interrogator signals are received within a predetermined period of time, and (b) determining if a first received interrogator signal corresponds to a side lobe interrogator signal and a second received interrogator signal corresponds to a reflected version of the first received signal.

With this particular arrangement, a technique which provides a reduced number of transponder replies to reflections of interrogation signals (including mode 5 interrogation signals) is provided. In one embodiment, a determination is made as to whether an interrogator signal is a side lobe interrogator signal by detecting a side lobe pulse above a predetermined threshold. In one embodiment, the predetermined period of time is selected in accordance with the needs of a particular application. In general, the predetermined period of time is selected to accommodate the time needed to receive a reflected signal. In some cases, the delay between the first received signal and the reflected signal will be relatively short (e.g. in the range of about 1-3 microseconds) while in other cases, the delay will be relatively long (e.g. in the range of about 8- 12 microseconds). For example, in some applications geographic factors (e.g. the existence of mountains, plains or other structures) or weather factors (including but not limited to the existence of ice, snow, rain, etc . . . ) affect the delay and thus are preferably taken into account in selecting a predetermined period of time. In some cases, a predetermined period of time is selected using empirical techniques.

In one embodiment, upon receipt of a first interrogator signal, a timer is started (to count the predetermined period of time) and interrogation symbols provided as part of the first interrogator signal are stored. If any other interrogation signals are received prior to expiration of the timer and such signals are not in side lobe suppression, (i.e. the receiver of the interrogator signal is in the sidelobe of the generator of the transponder signal) the interrogation symbols of such second received interrogation signals are compared to the interrogation symbols of the first received interrogator signal. If the interrogation symbols of the two (or more) interrogation signals match, the transponder reply process is ended (i.e. the transponder will not send a reply). If, on the other hand, interrogation symbols from the two signals do not match, reply processing is continued (i.e. the transponder will send a reply).

In one embodiment, a method of determining if a second received interrogator signal corresponds to a reflected version of the first received signal is accomplished by determining if the first and second interrogator signals have the same waveform codes.

DETAILED DESCRIPTION OF THE PREFERRED EMBODIMENTS

Figure 1:
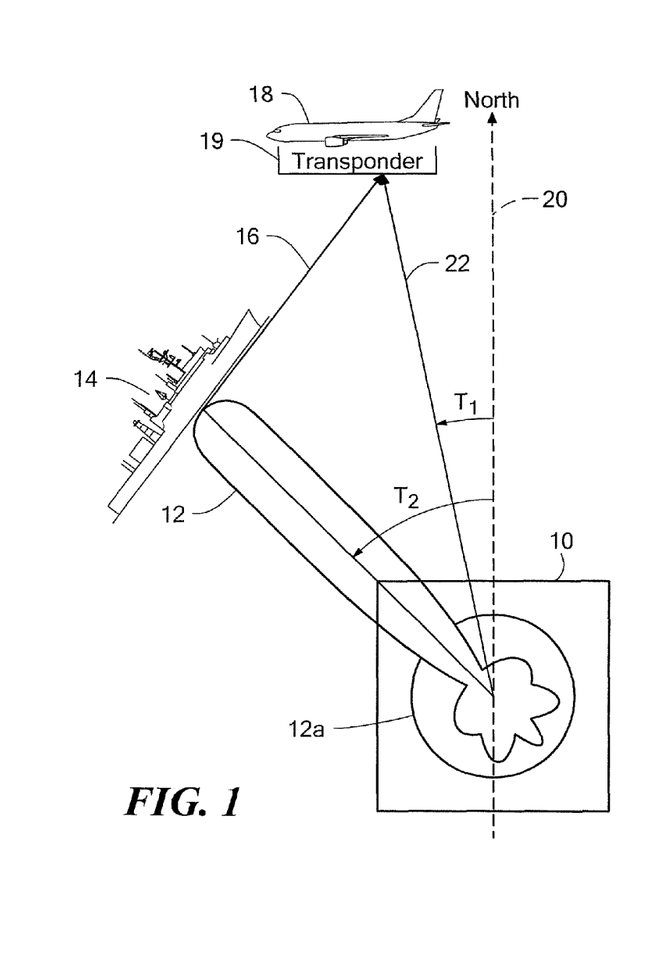
FIG. 1 is a block diagram of an identification friend or foe (IFF) system.

Referring to now to FIG. 1, an identification friend or foe (IFF) system 10, sometimes also referred to herein as ground station 10 and also known in non-military applications as a secondary surveillance radar or SSR includes a transmitting system through which so-called interrogator waveforms are generated and through which interrogator signals are emitted through an antenna which forms a radiation pattern having a main beam 12 and side lobes (not shown in FIG. 1). In desired operation, main beam 12 transmits a radio frequency (RF) signal interrogation at an aircraft having a transponder disposed thereon. The transponder receives the interrogation, processes it and determines whether it is in the main beam or sidelobe, the transponder determines if it is in the main beam, the transponder transmits a reply signal to the IFF/SRR system 10 as is generally known.

In the scenario illustrated in FIG. 1, however, main beam 12 when pointing at an angle T2 directs an RF signal (including interrogator signal waveforms) at an object 14. RF interrogator signals impinge ujpon and subsequently reflect from object 14 along a direction 16 such that the reflected RF signal 16 is intercepted by an aircraft 18 and in particular by a transponder 19 disposed on aircraft 18. Having received reflected interrogator signal 16, transponder 19 may provide a reply signal to IFF system 10.

Since main beam 12 was pointing in the direction of object 14 when the transponder reply signal was sent, the result is to declare a target at angle T1. When main beam 12 rotates to angle T1 it directs a new interrogation directly at aircraft 18 and upon receiving a reply from transponder 19, IFF system 10 declares a target an angle T2. Thus, reply from transponder 19 caused by reflection signal 16 off object 14 results in IFF system 10 concluding that an aircraft exists at angle T2.

Figure 2:
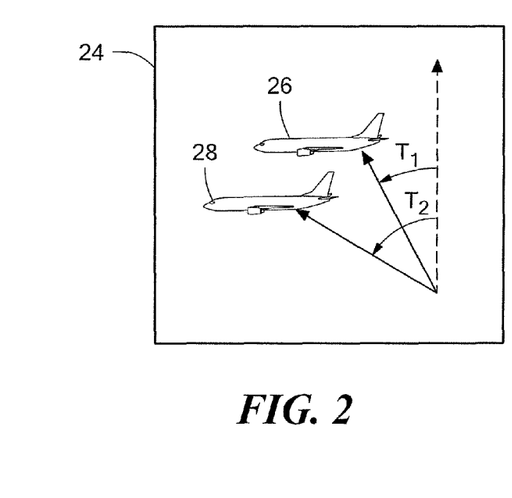
FIG. 2 is a diagram of an air traffic control (ATC) display having two aircraft displayed thereon.

Referring briefly to FIG. 2, under the scenario described above in conjunction with FIG. 1, if transponder 19 (FIG. 1) provides a reply signal to IFF ground station 10 (FIG. 1), at both angles T1 and T2 then an air traffic control system may mistakenly conclude that two aircraft exist. In this case, an ATC display 24 would show two aircraft icons 26, 28 where icon 26 corresponds to aircraft 18 (FIG. 1) and aircraft icon 28 corresponds to reflector 14 (FIG. 1). If, however, transponder 19 does not reply to reflected interrogator RF signal 16, then ATC display 24 would only shown the existence of aircraft 18 i.e. via display icon 26.

Figure 3:
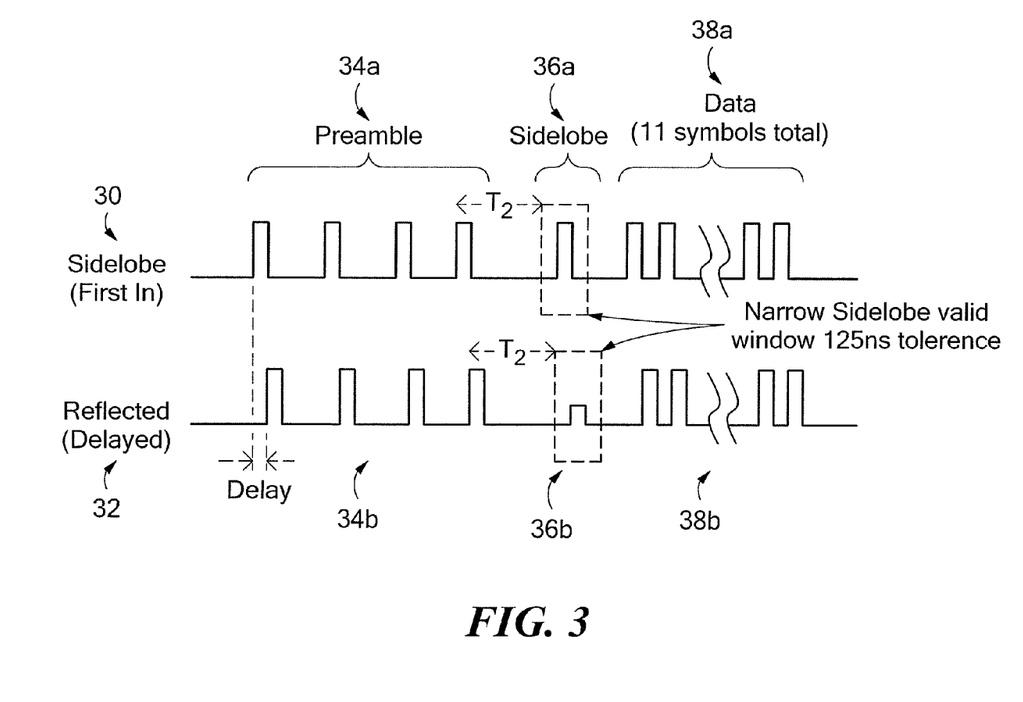
FIG. 3 is a pair of plots of time vs. amplitude of a Mode 5 waveform.

Referring again to FIG. 1, in accordance with the concepts and techniques described herein, transponder 19 may be configured such that it can distinguish between reflected interrogator signals, such as reflected interrogator signal 16, and interrogator signals transmitted directly thereto via a main beam (e.g. via main beam 12 of IFF/SSR ground station 10) or via a side lobe. Briefly, when transponder 19 receives an interrogator signal (e.g. a Mode 5 interrogation signal), transponder 19 determines whether the interrogator signal was provided thereto via a main beam (e.g. main beam 12) or via a side lobe. In one technique, this determination is made by detecting the presence or absence of a side lobe pulse (e.g. pulse 36a in FIG. 3).

In the case where an interrogator signal is provided to the transponder via a side lobe, the transponder 19 decides whether the interrogator signal is in the main beam or side lobe. In one embodiment, this is accomplished by means of an amplitude decision.

In one particular embodiment, the side lobe pulse is transmitted through an auxiliary antenna 12a (FIG. 1) having a substantially omnidirectional antenna pattern. The amplitude ratio of the first pulses (34a in FIG. 2) and the side lobe pulse (36a in FIG. 2) transmitted through a main beam differs from the amplitude ratio of the first and side lobe pulses transmitted through a side lobe. In the main beam, the amplitudes of the sidelobe pulses will be small compared with the amplitudes of the preamble pulses while in the side lobe the amplitudes will be approximately equal (it should be appreciated that pulses 34a are transmitted through the mainbeam, while pulses 36a are transmitted through the auxiliary antenna).

This provides the mechanism for distinguishing main lobe from side lobe interrogation signals. However, if an interrogator signal is provided to the transponder via a reflected main lobe RF signal, such a reflected interrogator signal will not include the side lobe pulse. Thus, in this case, a conventional transponder will reply to the reflected interrogator signal whereas transponder 19 will not reply due to additonal processing of signals performed by transponder 19.

Briefly, as is known, in Mode 5 the digital data changes each interrogation (i.e. each interrogation contains a random number portion generated by a cryptographic unit). By recognizing that a reflected RF main beam signal (e.g. reflected RF signal 16 in FIG. 1) has the same data as the non-reflected side lobe signal (except the suppression pulses are below a side lobe threshold) the system is able to determine that the second arriving signal is a reflected version of the first (side lobe interrogation) and it is possible for the transponder 19 to determine whether it should respond to a received interrogator signal.

Simply stated, if a transponder determines it has received a main beam interrogator signal after receiving a side lobe signal for the same interrogator signal (e.g. two interrogator signals having the same code), then the transponder can conclude that the main beam interrogator signal was received due to a reflection. In this case, the transponder should not reply to the interrogator signal.

In one particular embodiment, the transponder utilizes the data in the interrogator signal (also sometimes referred to as an interrogator message) to confirm that when two interrogation signals (e.g. a signal from a side lobe followed by a signal from a main beam) are received within a predetermined period of time (e.g. 2 us), by comparing the data fields, the presence of multipath reflection can be correctly identified and the reply to the main beam interrogator signal can be suppressed.

Figure 4:
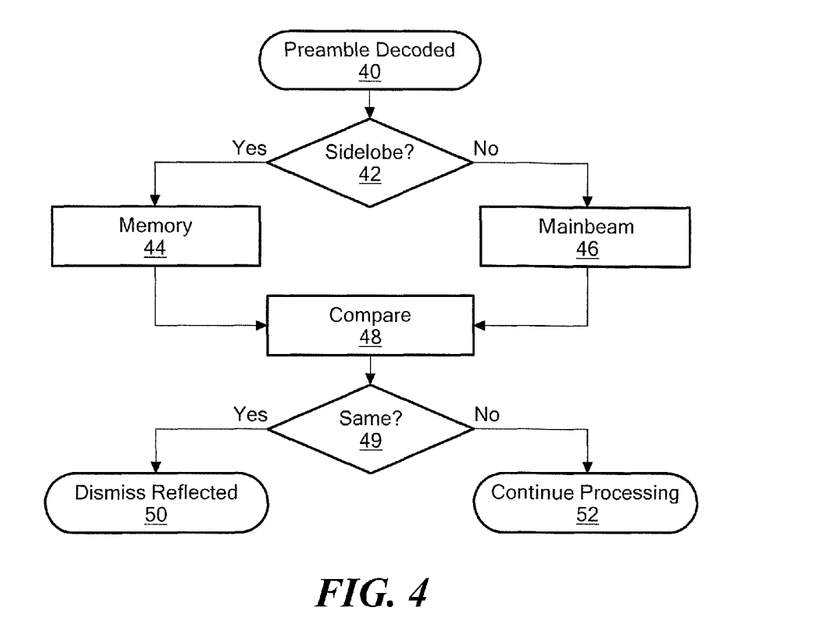
FIG. 4 is a flow diagram illustrating a process for detecting main lobe multipath presence.
Figure 6:
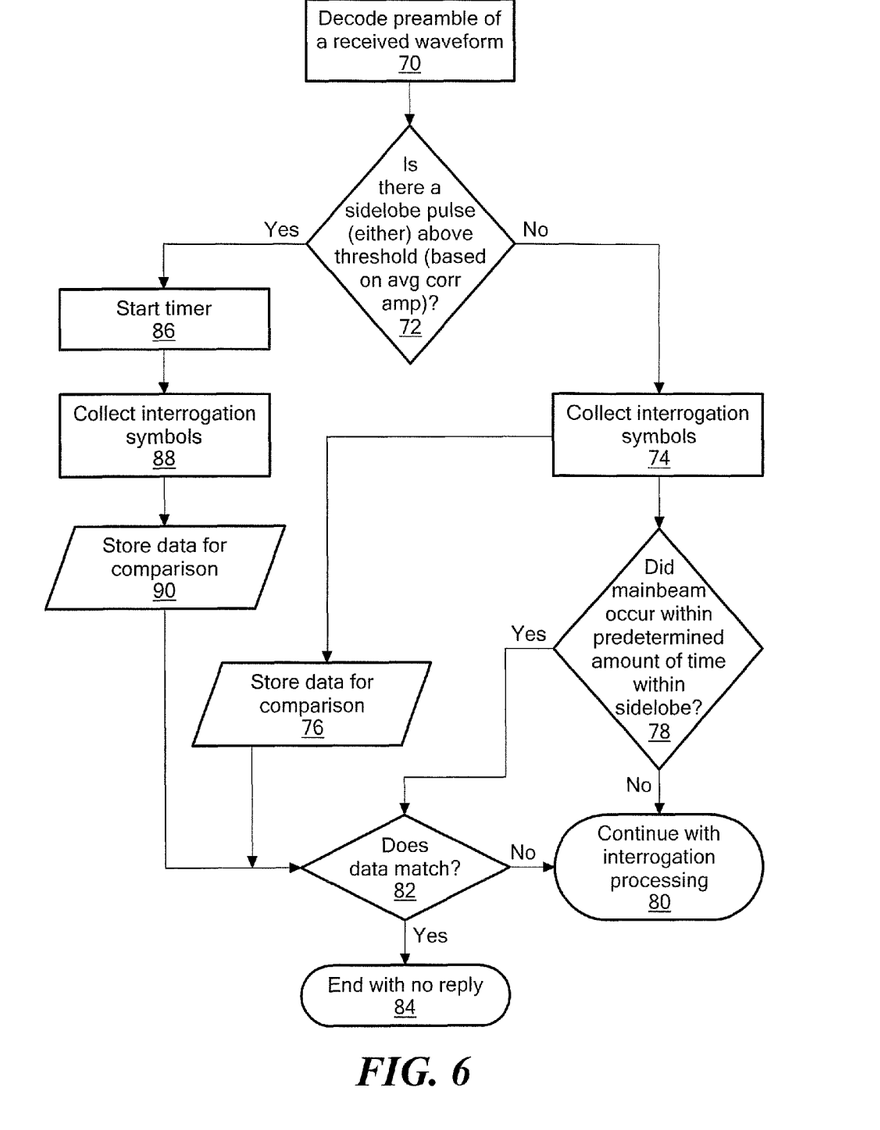
FIG. 6 is another flow diagram illustrating a process for detecting main lobe multipath presence.

FIGS. 4 and 6 are flow diagrams showing the processing performed by a transponder to reduce the number of transponder replies provided in response to reflected Mode 5 waveforms.

The rectangular elements (typified by element 44 in FIG. 4), are herein denoted "processing blocks" and represent computer software instructions or groups of instructions. The diamond shaped elements (typified by element 42 in FIG. 4) are herein denoted "decision blocks" and represent computer software instructions, or groups of instructions which affect the execution of the computer software instructions represented by the processing blocks. It should be noted that the flow diagrams of FIGS. 4 and 6 represents one embodiment of the design and variations in such a diagram, which generally follow the process outlined are considered to be within the scope of the concepts described and claimed herein.

Alternatively, the processing and decision blocks represent operations performed by functionally equivalent circuits such as a digital signal processor circuit or an application specific integrated circuit (ASIC) of a field programmable gate array (FPGA). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIGS. 4 and 6 can be performed in any convenient or desirable order.

Turning now to FIG. 4, a process for determining whether a transponder should reply to a Mode 5 waveform transmitted by an interrogator system (e.g. an IFF system) begins in processing block 40 by decoding a preamble of a received waveform.

Once the preamble is decoded, processing proceeds to decision block 42 where a decision is made as to whether the received waveform was from a side lobe. In one embodiment, this is accomplished, for example, by determining whether the received waveform includes a side lobe suppression pulse. If in decision block 42, a decision is made that the waveform was from a side lobe, then processing proceeds to processing block 44 where the data is stored in a storage (e.g. a random access memory or other type of volatile or non-volatile memory). Processing then proceeds to processing block 48 where a comparison of the data in the received waveform is made with data of a reflected signal which has already been received and stored.

Processing proceeds to decision block 49 where a determination is made as to whether the waveforms of the two received signals are identical. If the waveforms of the two received signals are identical, then the data from the reflected signal is dismissed as shown in processing block 50. If on the other hand, the waveforms of the two received signals are not identical, then as shown in processing block 52, processing of the waveform continues. Such further processing may include, for example, decryption of the interrogation, determination of a proper reply and generation of a proper reply signal.

Figure 5:
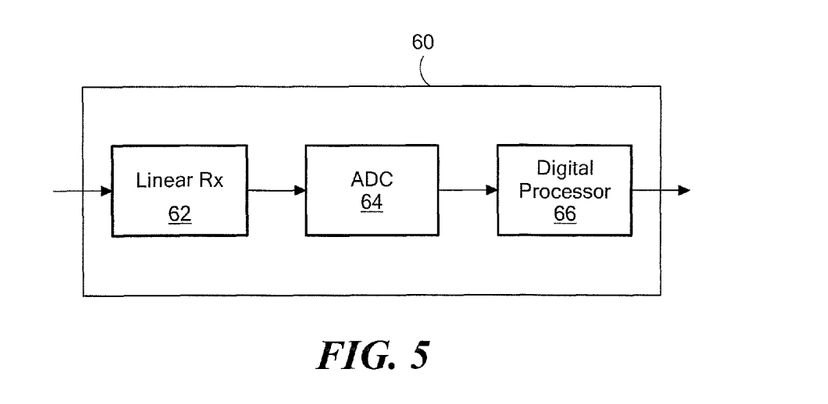
FIG. 5 is a block diagram of a transponder operating in accordance with the techniques described in conjunction with FIGS. 4 and 6.

Referring now to FIG. 5, a transponder 60 in which a process which is the same as or similar to that described above in conjunction with FIG. 4 and below in conjunction with FIG. 6 may be performed, includes a linear receiver 62 which receives an interrogator input signal via an antenna (not shown) and provides the received signal to an analog-to-digital converter (ADC) 64. ADC 64 receives the analog signal provided thereto and provides a corresponding digital signal to a digital processing circuit 66. Digital processing circuit 66 may be provided, for example, as a field programmable gate array (FPGA), an application specific integrated circuit (ASIC) or any other type of processing circuit capable of processing digital signals provided thereto.

If transponder 60 determines it has received a main beam interrogator signal within a predetermined period of time after receiving a side lobe signal for the same interrogator, then transponder 60 concludes that the main beam interrogator signal was received due to a reflection. Transponder 60 can conclude that two received interrogator waveforms are the same if they are encoded with the same waveform code.

Referring now to FIG. 6, a process for determining whether a transponder should reply to a Mode 5 waveform provided by an IFF system (e.g. IFF system 10 described above in conjunction with FIG. 1) begins in processing block 70 by decoding a preamble of a received waveform. In one exemplary embodiment, the decoding technique draws information from a preamble detection module in which three (3) of four (4) preamble detection criteria are met (detection criteria as set forth, for example, in AIMS 03-1000) and an average amplitude of received pulses are computed to make an interrogator side lobe suppression (ISLS) decision.

Once the preamble is decoded, processing proceeds to decision block 72 where a determination is made as to whether a valid side lobe detection has occurred.

Ordinarily, when a side lobe is detected the message data is discarded. However, in accordance with the concepts described herein, the side lobe data as shown is routed to processing block 86 where a timer is started. In one exemplary embodiment, a two microsecond timer is started. It should be appreciated that timer lengths longer or shorter than two microseconds may also be used. Thus, the timer or "window" referred to herein may be adjusted for particular applications based upon empirical results.

In some applications, for example, the timing window can be expanded to greater than 2 us to allow rejection of later reflections. In any particular application, the timer is selected to accommodate the time needed to receive a reflected signal. For example, it may be discovered that in a particular application, geographic factors (e.g.

the existence of mountains, plains or other structures) or weather factors (including but not limited to the existence of ice, snow, rain, etc . . . ) or other factors may promote selection of a timer which is greater or less than 2 us.

Processing then proceeds to processing block 88 in which interrogation symbols are despread. In one exemplary embodiment, eleven (11) interrogation symbols are despread and Walsh data is decoded to obtain thirty six (36) bits of a data message. Processing then proceeds to processing block 90 where data is stored.

If the next valid preamble detection is a main lobe signal, then information is routed to processing block 74 and the interrogation symbols are despread and the Walsh data is decoded. In the exemplary embodiment described above, eleven (11) interrogation symbols are despread and the Walsh data is decoded to obtain thirty six (36) data bits. This data is stored as shown in processing clock 76.

Processing also proceeds from processing block 74 to decision block 78 wherein a decision is made as to whether the main lobe detection occurred within a predetermined amount of time of the side lobe detection.

If, in decision block 78, a decision is made that the main lobe detection did not occur within a predetermined time of the side lobe detection processing, then processing proceeds to processing block 80 where interrogation processing continues in the transponder.

If, on the other hand, a decision in decision block 78 that the main lobe detection occurred within the predetermined time of the side lobe detection processing, then processing proceeds to decision block 82 where a comparison is made between the data in each waveform. For example, in the exemplary embodiment in which thirty-six (36) data bits are used in each waveform, a comparison is made between the two sets of thirty-six (36) bits. In one embodiment, this occurs only if the two signals are detected within 2 us of each other (e.g. within a 2 us window). It should be noted that in one embodiment after a predetermined period of time corresponding to the length of the timer (e.g. 2 us), the stored data is discarded.

If in decision block 82, a decision is made that the two sets of data match (e.g. the two sets of thirty-six (36) bits are identical), it can be concluded that the second received signal is clearly due to multipath. In this case, processing proceeds to processing block 84 and the transponder reply signal is suppressed.

If, on the other hand, in decision block 82 a decision is made that the two sets of thirty six (36) bits are not identical, then processing proceeds to processing block 80 where interrogation processing continues in the transponder.

Figure 7:
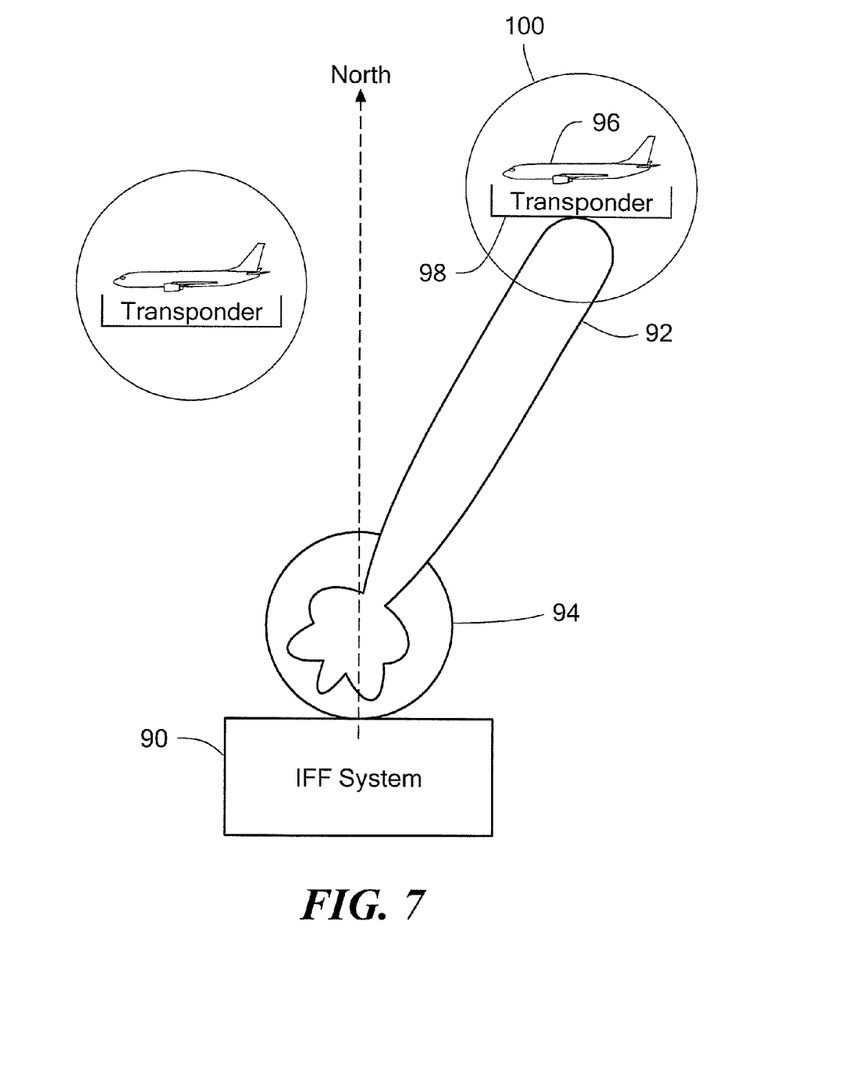
FIG. 7 is a block diagram of an identification friend or foe (IFF) system.
Figure 7A:
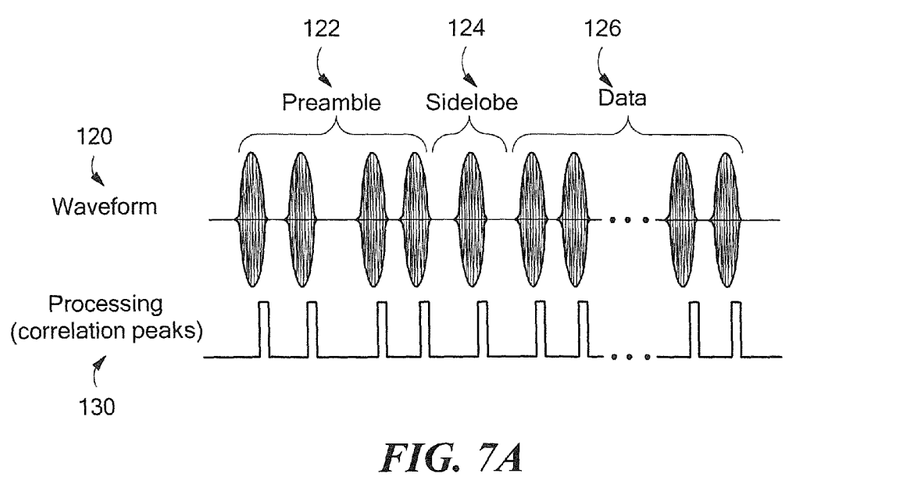
FIG. 7A is a plot of a waveform resultant from an interrogator signal (e.g. transmitted via a main beam) and includes preamble pulses attached a side lobe pulse and a data pulse.
Figure 7B:
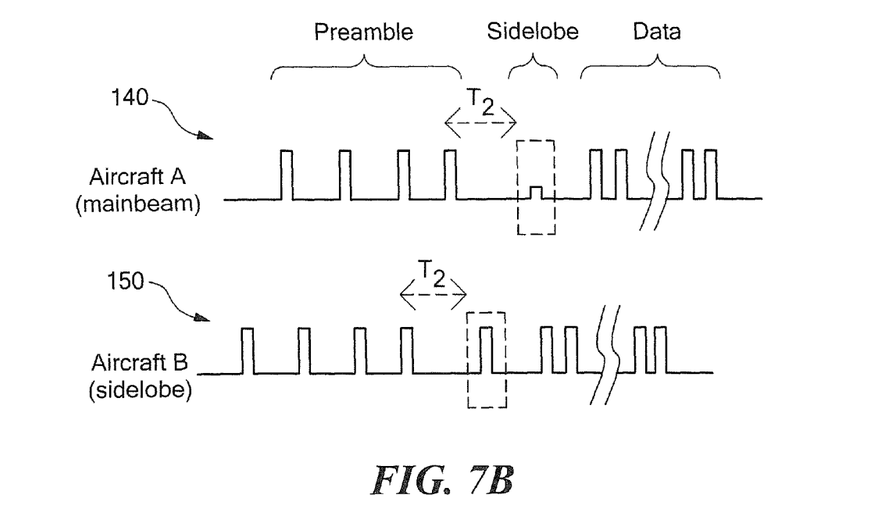
FIG. 7B is a plot of a first bit pattern generated via a main beam transponder signal and a second bit pattern generated via a side lobe.

Referring now to FIGS. 7-7B, an IFF system 90 has a first antenna, having a main directional beam 92 and a second antenna having an omni-directional beam 94. Directional beam 92 detects an object 96 having a transponder 98. Object 96 (or transponder 98) includes an RF antenna having a substantially omnidirectional antenna pattern 100 about object 96.

Referring now to FIG. 7A, a waveform 120 resultant from an interrogator signal (e.g. transmitted via main beam 92 in FIG. 7) includes preamble pulses attached a side lobe pulse 124 and data pulse 126. The raw waveform data is processed (e.g. via a correlation operation) to generate a corresponding bit pattern 130.

Referring now to FIG. 7B, a first bit pattern 140 generated via a main beam transponder signal and a second bit pattern 150 generated via a side lobe are shown.

The two patterns 140, 150 are compared and if the patterns match, the transponder determines that it is not necessary to reply to both interrogation signals.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A transponder comprising:
a linear receiver configured to receive one or more interrogator signals;
an analog-to-digital converter (ADC) having an input configured to receive an analog signal from said linear receiver and having an output at which a digital signal is provided; and
a digital processor configured to receive digital signals provided thereto from said ADC and to suppress transmission of a reply signal if:
two interrogator signals are received within a predetermined period of time;
a first interrogator signal of the two interrogator signals corresponds to a side lobe interrogator signal and a second interrogator signal of the two interrogator signals corresponds to a main beam signal; and
a first interrogator signal and the second interrogator signal both include the same waveform code.

2. The transponder of claim 1 wherein the predetermined period of time is in the range of about 1 microsecond to about 14 microseconds.

3. A transponder comprising:
   (a) a receiver to receive one or more interrogator signals; and
   (b) a signal processor to suppress transmission of a transponder reply signal in response to two interrogator signals being received within a predetermined period of time with a first received interrogator signal corresponding to a side lobe interrogator signal and a second received interrogator signal corresponding to a main beam signal if the first received interrogator signal and the second received interrogator signal both include the same wafeform code.

4. The transponder of claim 3 wherein said signal processor comprises:
   a detector for determining if two interrogator signals are received within a predetermined period of time;
   a detector for determining if a first received interrogator signal of the two interrogator signals corresponds to a side lobe interrogator signal and a second received interrogator signal of two interrogator signals corresponds to a main beam signal;
   a decoder to decode a first waveform code of the first received interrogator signal and a second waveform code of the second received interrgator signal; and
   a comparator to compare the first waveform code and the second waveform code to determine whether they are the same waveform code.

5. A method for determining whether a transponder should reply to an interrogator signal, the method comprising:
   (a) determining if two interrogator signals are received at the transponder within a predetermined period of time;
   (b) determining if a first received interrogator signal of the two interrogator signals corresponds to a side lobe interrogator signal and a second received interrogator signal of the two interrogator signals corresponds to a main beam interrogator signal; and
   (c) determining if the first received interrogator signal and the second received interrogator signal include the same wavecode.

6. The method of claim 5 further comprising:
   suppressing transmission of a reply signal if:
   the two interrogator signals are received at the transponder within the predetermined period of time;
   the first received interrogator signal corresponds to a side lobe interrogator signal and the second received interrogator signal corresponds to a main beam interrogator signal; and
   the first received interrogator signal and the second received interrogator signal include the same waveform code.

7. The method of claim 5, wherein:
   determining if the first received interrogator signal and the second received interrogator signal include the same waveform code comprises:
   despreading and decoding a first waveform code in the first received interrogator signal;
   despreading and decoding a second waveform code in the second received interrogator signal; and
   comparing the first waveform code and the second waveform code.

8. The method of claim 5, wherein:
   determining if two interrogator signals are received at the transponder within a predetermined period of time includes determining if two Mode-5 Identification Friend or Foe interrogator signals are received.

* * * * *